(12) United States Patent
Wakui et al.

(10) Patent No.: US 8,294,937 B2
(45) Date of Patent: Oct. 23, 2012

(54) PRINT SYSTEM FOR CONFERENCING AND PRINT METHOD THEREOF

(75) Inventors: Katsuaki Wakui, Toyokawa (JP); Yoichi Kurumasa, Toyokawa (JP); Toshihisa Motosugi, Okazaki (JP); Shinichi Asai, Gamagoori (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 386 days.

(21) Appl. No.: 12/562,898

(22) Filed: Sep. 18, 2009

(65) Prior Publication Data

US 2010/0073720 A1 Mar. 25, 2010

(30) Foreign Application Priority Data

Sep. 19, 2008 (JP) ................... 2008-241821

(51) Int. Cl.
*G06F 3/12* (2006.01)
*G06K 9/00* (2006.01)
(52) U.S. Cl. .................. 358/1.15; 358/1.1; 382/118
(58) Field of Classification Search .............. 358/1.15, 358/1.1, 1.9; 382/118
See application file for complete search history.

(56) References Cited

U.S. PATENT DOCUMENTS

| | | | | |
|---|---|---|---|---|
| 2008/0112008 A1* | 5/2008 | Kikugawa | .................. | 358/1.15 |
| 2008/0181648 A1* | 7/2008 | Makishima et al. | ............ | 399/75 |
| 2008/0198421 A1 | 8/2008 | Hirahara et al. | | |

FOREIGN PATENT DOCUMENTS

| | | |
|---|---|---|
| JP | 2005-229597 | 8/2005 |
| JP | 2006-72471 | 3/2006 |
| JP | 2008-134950 | 6/2008 |
| JP | 2008-192137 | 8/2008 |
| JP | 2008-198179 | 8/2008 |

OTHER PUBLICATIONS

Japanese Notification of Reasons for Refusal mailed Jul. 13, 2010, directed to counterpart Japanese Application No. 2008-241821; 5 pages.

* cited by examiner

*Primary Examiner* — King Poon
*Assistant Examiner* — Iriana Cruz
(74) *Attorney, Agent, or Firm* — Morrison & Foerster LLP (57) ABSTRACT

A print system for conferencing includes a plurality of print apparatuses that are provided in a plurality of conference locations and interconnected via a network; a storage that registers in itself, data of conference material and information of prospective attendees from the respective conference locations; and a detector that detects the start of a conference. Each of the print apparatuses obtains and records the registered data of conference material and information of prospective attendees from the conference location where the print apparatus is provided, then prints as many copies of conference material as the number of the prospective attendees, if the start of a conference is detected.

12 Claims, 11 Drawing Sheets

Display Job | Setting | Selected Box Information | Box Number 000000001 | Box Name Conference 1 | Box Type Shared

Y ☐ M ☐ C ☐ K ☐

Please select your preferable Box.
You can use numeric keys to specify a Box by its Box number.

Shared | System | Search Box

000000001 Conference 1

| 000000001 Conference 1 | 000000002 Conference 2 | 000000003 Conference 3 | 1/1 |

Specify Box Number [    ]

2008/03/24 04:32
Remaining Memory Capacity 100%

Cancel | OK

FIG.7

Display Job | Setting | Preview | List of Selected Documents — Conference Material, Conference Material 2 | ⇧ 1/1 ⇩ | Detail

Y ☐ M ☐ C ☐ K ☐

Please select a document to edit.
After that, please select an edit process to be done on the document.

Edit Document

000000001 Conference 1

| Conference Material | Conference Material 2 | | 1/1 | Edit Process |
| Master Point | Slave Point | | Select All | Delete |
| Mr./Ms. L | Mr./Ms. N | | Release All | Change name |
| Mr./Ms. M | Mr./Ms. P | | Display List | Transfer Document |
| | Mr./Ms. Q | | | Copy Document |
| | | | | Edit Detail |

2008/03/24 13:05
Remaining Memory Capacity 99%

Cancel

PRINT SYSTEM FOR CONFERENCING AND PRINT METHOD THEREOF

This application claims priority under 35 U.S.C. §119 to Japanese Patent Application No. 2008-241821 filed on Sep. 19, 2008, the entire disclosure of which is incorporated herein by reference in its entirety.

BACKGROUND OF THE INVENTION

1. Field of the Invention

The present invention relates to a print system for conferencing, in which print apparatuses are provided in a plurality of conference locations and interconnected via a network, and a print method implemented by the print system for conferencing.

2. Description of the Related Art

The following description sets forth the inventor's knowledge of related art and problems therein and should not be construed as an admission of knowledge in the prior art.

In many cases, material handed out to attendees of a conference is printed documents, not electronic documents, for better readability and legibility.

As a technology to print such material to be handed out in a conference, a print system is suggested in Japanese Unexamined Laid-open Patent Publication No. 2006-072471, and the print system facilitates printing material necessary for a scheduled event such as a conference, with contents and a print form suitable for the event, and in time for the scheduled event.

However, there is a problem here with the conventional print systems including the one that facilitates printing material based on information of prospective attendees before the start of a conference, then handing them out to attendees, as described in Japanese Unexamined Laid-open Patent Publication No. 2006-072471. That is, if a scheduled conference happens to be changed or cancelled just before the start thereof, printed material become wasted.

And also, there is a security problem, that if a conference happens to be cancelled after material is printed, information even about the cancelled conference may be leaked due to the existence of the printed material.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an object of the present invention to provide a print system for conferencing, which prevents wasting printed material and eliminates the risk of leaking of conference information, caused due to the existence of printed material, even if a scheduled conference happens to be changed or cancelled just before the start thereof.

It is another object of the present invention to provide a print method for conferencing, implemented by the print system for conferencing.

According to a first aspect of the present invention, a print system for conferencing includes:

a plurality of print apparatuses provided in a plurality of conference locations and interconnected via a network;

a storage that registers in itself, data of conference material and information of prospective attendees from the respective conference locations; and a detector that detects the start of a conference, and wherein each of the print apparatuses provided in the respective conference locations comprises:

an obtainer that obtains the data of conference material and the information of prospective attendees from the conference location where the print apparatus itself is provided, which are registered in the storage;

a memory that records in itself, the data of conference material and the information of the prospective attendees, obtained therefrom; and a printer that prints as many copies of conference material as the number of the prospective attendees, if the detector detects the start of a conference.

According to a second aspect of the present invention, a print method for conferencing includes:

registering in a storage, data of conference material and information of prospective attendees from the respective conference locations;

detecting the start of a conference;

obtaining by each of the print apparatuses, the data of conference material and the information of prospective attendees from the conference location where the print apparatus is provided, which are registered in the storage;

recording in a memory of each of the print apparatuses, the data of conference material and the information of the prospective attendees, obtained therefrom; and printing by each of the print apparatuses, as many copies of conference material as the number of the prospective attendees, if the start of a conference is detected.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
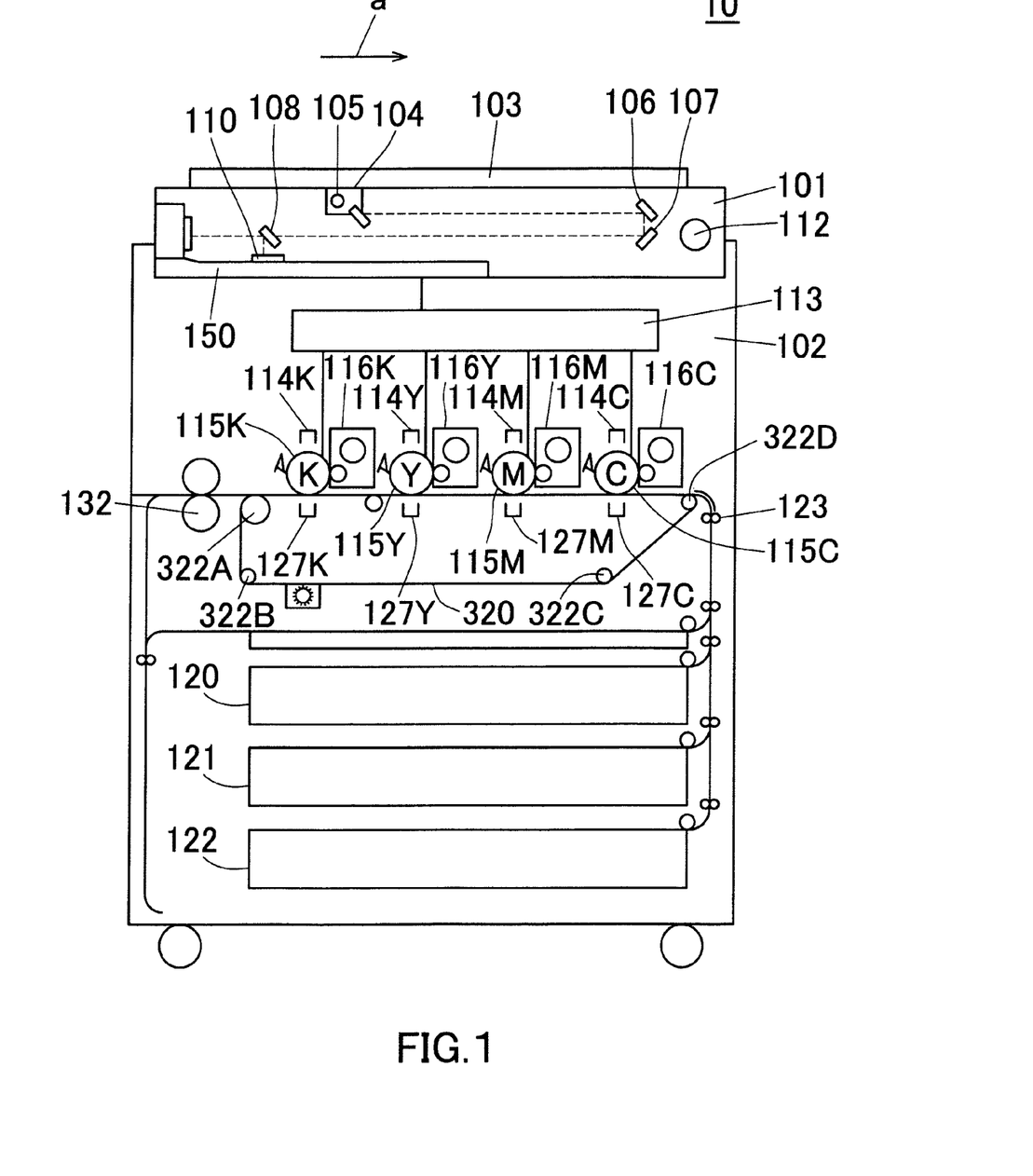
FIG. 1 is a sectional view showing an example of a frame format of a print apparatus employed in a print system for conferencing according to one embodiment of the present invention.

FIG. 1 is a sectional view showing an example of a frame format of a print apparatus employed in a print system for conferencing according to one embodiment of the present invention. In this embodiment, a MFP (Multi Function Peripheral) 10 that is a tandem multifunctional full-color digital image forming apparatus collectively having the copy function, the print function, the facsimile function and other functions, is employed as the print apparatus.

As shown in FIG. 1, the MFP 10 includes an image reader 101 that reads out image data from a document and a printer 102 that prints an image on a sheet.

An expose lamp 105 installed on a scanner 104 exposes to light, a document placed on a document table 103 of the image reader 101. The light reflected from the surface of the document goes to a CCD 10, through mirrors 106, 107 and 108 and a light collecting lens, then forms an image thereon. The CCD 110 converts the light reflected from the surface of the document, into RGB color data (an analog signal), and outputs to the MFP 10. The scanner 104 scans the entire surface of the document by repeatedly sliding in the direction indicated by Arrow a, with power from a scanner motor 112.

And an image processor 150 executes processing on the analog signal inputted from the CCD 110 and outputs a digital signal to a laser system 113.

The digital signal inputted into the laser system 113 from the image processor 150, corresponds to an image color data piece of Cyan, an image color data piece of Magenta, an image color data piece of Yellow and an image color data piece of Black. According to the inputted image color data pieces, the laser system 113 outputs laser beams to photoreceptor drums 115C, 115M, 115Y and 115K provided for the colors, Cyan, Magenta, Yellow and Black, respectively.

Inside of the printer 102, the laser beams outputted from the laser system 113 expose the photoreceptor drums 115C, 115M, 115Y and 115K electro-statically charged by electrostatic chargers 114C, 114M, 114Y and 114K, and form electrostatic latent images thereon, respectively. And developers 116C, 116M, 116Y and 116K provided for the four colors, Cyan, Magenta, Yellow and Black, develop the electrostatic latent images formed on the photoreceptor drums 115C, 115M, 115Y and 115K, respectively.

Meanwhile, a looped belt 320 is hung without slack, by a drive roller 322A, fixed rollers 322B, 322C and 322D. When the drive roller 322A turns around in a counterclockwise direction of FIG. 1, the looped belt 320 also turns around in a counterclockwise direction of FIG. 1, at a predetermined speed.

Now, an appropriate sheet is transferred from a sheet feed cassette 120, 121 or 122 and a timing roller 123 provides the sheet on the looped belt 320. Keeping the provided sheet on itself, the looped belt 320 transfers it in the left direction of Figure. And thus, the sheet is brought into contacts with the photoreceptor drums 115C, 115M, 115Y and 115K, for the colors, Cyan, Magenta, Yellow and Black, in this order. When the sheet closely slides on the photoreceptor drums 115C, 115M, 115Y and 115K, transfer chargers 127C, 127M, 127Y and 127K coupled with the photoreceptor drums 115C, 115M, 115Y and 115K, transfer onto the sheet, toner images formed on the photoreceptor drums.

A pair of fix rollers 132 heat the sheet holding the toner images, and thereby the toner is melted and fixed on the sheet. After that, the sheet is discharged from the printer 12.

Figure 2:
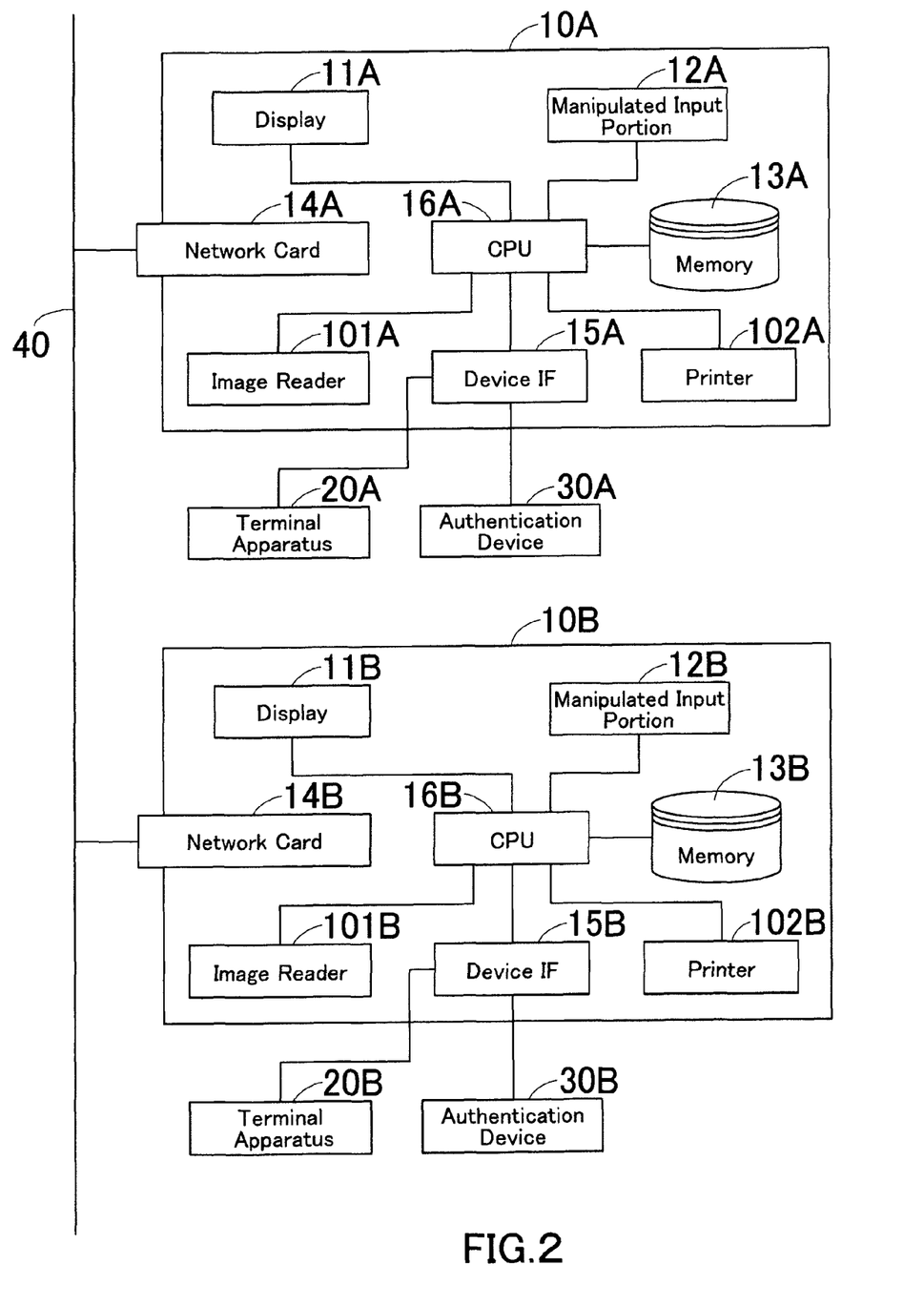
FIG. 2 is a block diagram showing a hardware configuration of a print system for conferencing in which the print apparatus of FIG. 1 is employed, according to one embodiment of the present invention.

FIG. 2 is a block diagram showing a hardware configuration of a print system for conferencing according to one embodiment of the present invention, in which the MFP 10 of FIG. 1 is employed.

As shown in FIG. 2, the print system for conferencing includes MFPs 10A and 10B, terminal apparatuses 20A and 20B and authentication devices 30A and 30B, provided in different conference locations, for example a plurality of conference rooms, respectively. The MFPs 10A and 10B are interconnected via a communication network 40, thus they are capable of exchanging data. The terminal apparatuses 20A and 20B are connected to the communication network 40, via the MFP 10A and 10B, respectively.

The communication network 40 may be a LAN, Internet, a dedicated line, a packet communication network, a collective entity of some of them, or etc. Also, it may be wired or wireless.

The MFPs 10A and 10B both have the same configuration as the MFP 10 explained with FIG. 1. Hereinafter, explanation of a hardware configuration of the MFP 10A will be provided on behalf, and explanation about the MFP 10B will be omitted.

The MFP 10A includes an image reader 101A and a printer 102A having the same configurations as the image reader 101 and the printer 102 explained with FIG. 1. Furthermore, it also includes a display 11A, a manipulated input portion 12A, a memory 13A, a network card 14A, a device interface (device IF) 15A and a CPU 16A.

The image reader 101A includes an image sensor such as a CCD. And it controls a slider, various image processing operations and etc., optically reads a document and converts it into an electric signal, as described above.

The printer 102A controls an engine that forms an image by a laser system, various image processing operations and etc., and outputs an image on a recording sheet according to the electric signal, as described above.

The printer 102A does not necessarily form an image by a laser system, and may form an image by another system such as an inkjet system. Also, it may form a monochrome image, not a full-color image.

The display 11A includes a liquid-crystal panel and etc., and displays on itself an operation mode of the MFP 10A, various entry buttons, a message for a user, an indication for operation, an image for preview and etc.

The entry portion 12A is used by a user for operating the MFP 10A, and includes a key entry portion having numeric keys, a start key, a stop key and other keys; a touch panel provided on the surface of the display 11A; and etc.

The memory 13A consists of a recording medium such as a hard disk drive, and records in itself image data read out from a document by the image reader 101A, print data received from an external apparatus, and other data. And also, in this embodiment, the memory 13A records in itself information of prospective attendees and data of conference material that are entered by operating the MFP 10A or received from another MFP. Furthermore, it also records in itself authentication data of many users including attendees of a conference.

The network card 14A functions as a communicator to connect the MFP 10A to an external apparatus such as the MFP 10B, via the network 40.

The device interface 15A is connected to the authentication device 30A, and thereby receives authentication data from the authentication device 30A. As to be described later, it may function as an interface to connect to a USB memory, if the USB memory is employed as the authentication device 30A.

The CPU 16A centrally controls all operations of the MFP 10A by executing processing according to an operation program recorded in a recording medium such as a ROM not shown in Figure. Furthermore, in this embodiment, the CPU 16A has a function to detect the start of a conference according to a signal from the terminal apparatus 20A, a function to identify attendees of the conference, a function to judge whether or not the attendees are identical with prospective attendees of the conference, by comparing them, and other functions.

The terminal apparatus 20A (20B) is a terminal for audio conferencing or a terminal for video conferencing, for example. It includes a microphone that enters attendees' voice, and transmits an audio signal entered by the microphone, to the terminal apparatus 20B (20A) provided in a different conference location, via the MFP 10A (10B) and the network 40. It also includes a speaker that reproduces voice based on the audio signal received from the terminal apparatus 20B (20A) in a different conference location. The terminal apparatus 20A (20B) establishes a connection by exchanging a connection check signal such as a PIN code.

The authentication devices 30A and 30B are used to authenticate attendees at a conference in the respective conference locations. For example, the authentication devices 30A and 30B include a portable recording medium owned by an attendee such as a USB memory, recording in itself authentication data to identify the owner attendee, such as a user ID and a password; a photographic device that takes a facial photo of an attendee and outputs authentication data based on data of the obtained facial photo; and etc.

In this embodiment, the authentication data obtained from the authentication devices 30A and 30B is transmitted to the CPU 16A of the MFP 10A, via the device interface 15A. The CPU 16A identifies the attendee by comparing the received authentication data to the authentication data recorded in the memory 13A.

Alternatively, the authentication devices 30A and 30B may record the authentication data in themselves and perform authentication of the attendee.

Alternatively, if a user logs in by entering the authentication data such as a user ID and a password by operating the manipulated input portions 12A and 12B of the MFPs 10A and 10B, just like he/she does in order to operate the MFPs 10A and 10B, the MFPs 10A and 10B may identifies this login user as an attendee.

Figure 3:
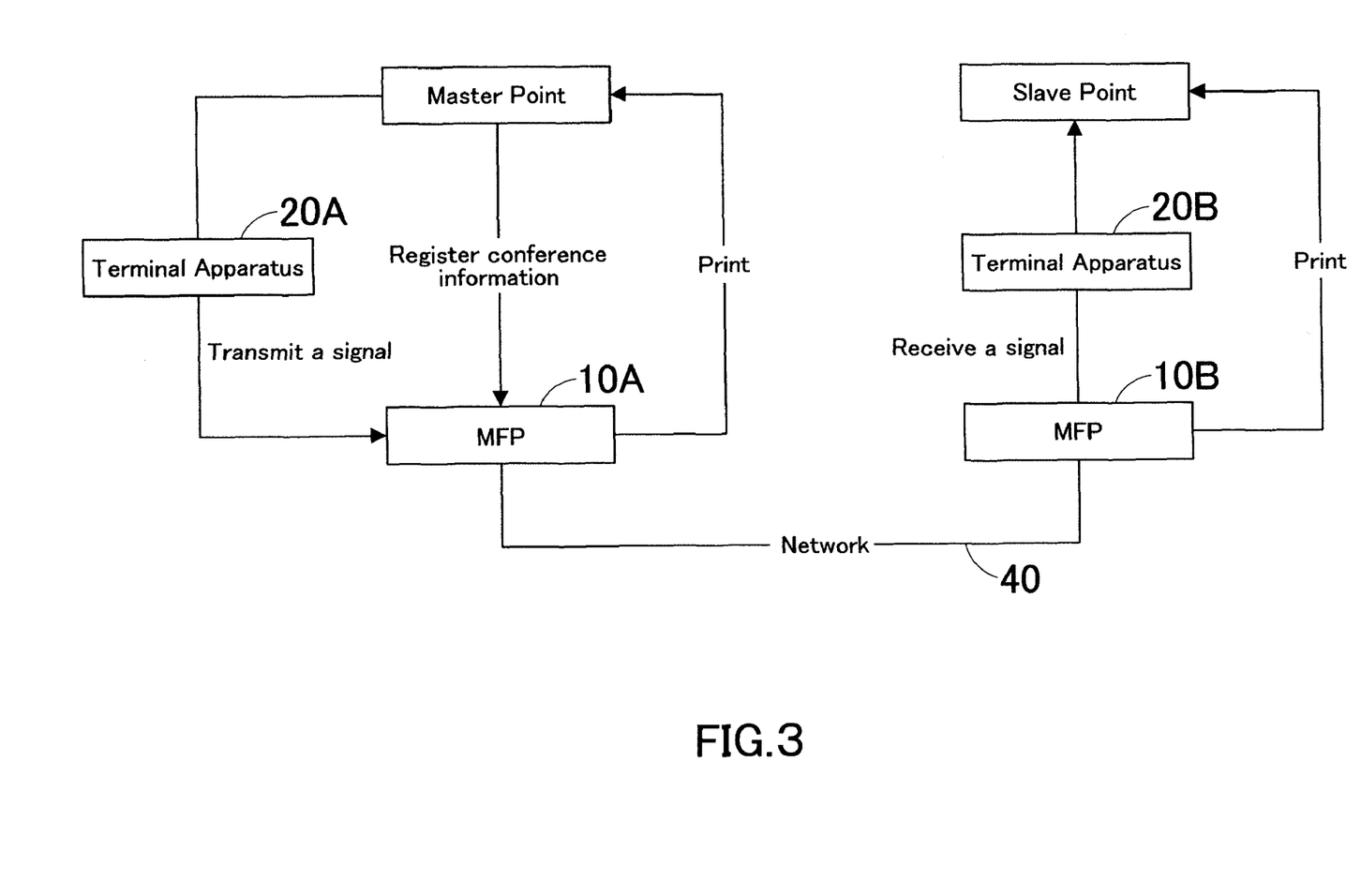
FIG. 3 is a view to explain the usage of the print system for conferencing, shown in FIG. 2.
Figure 4:
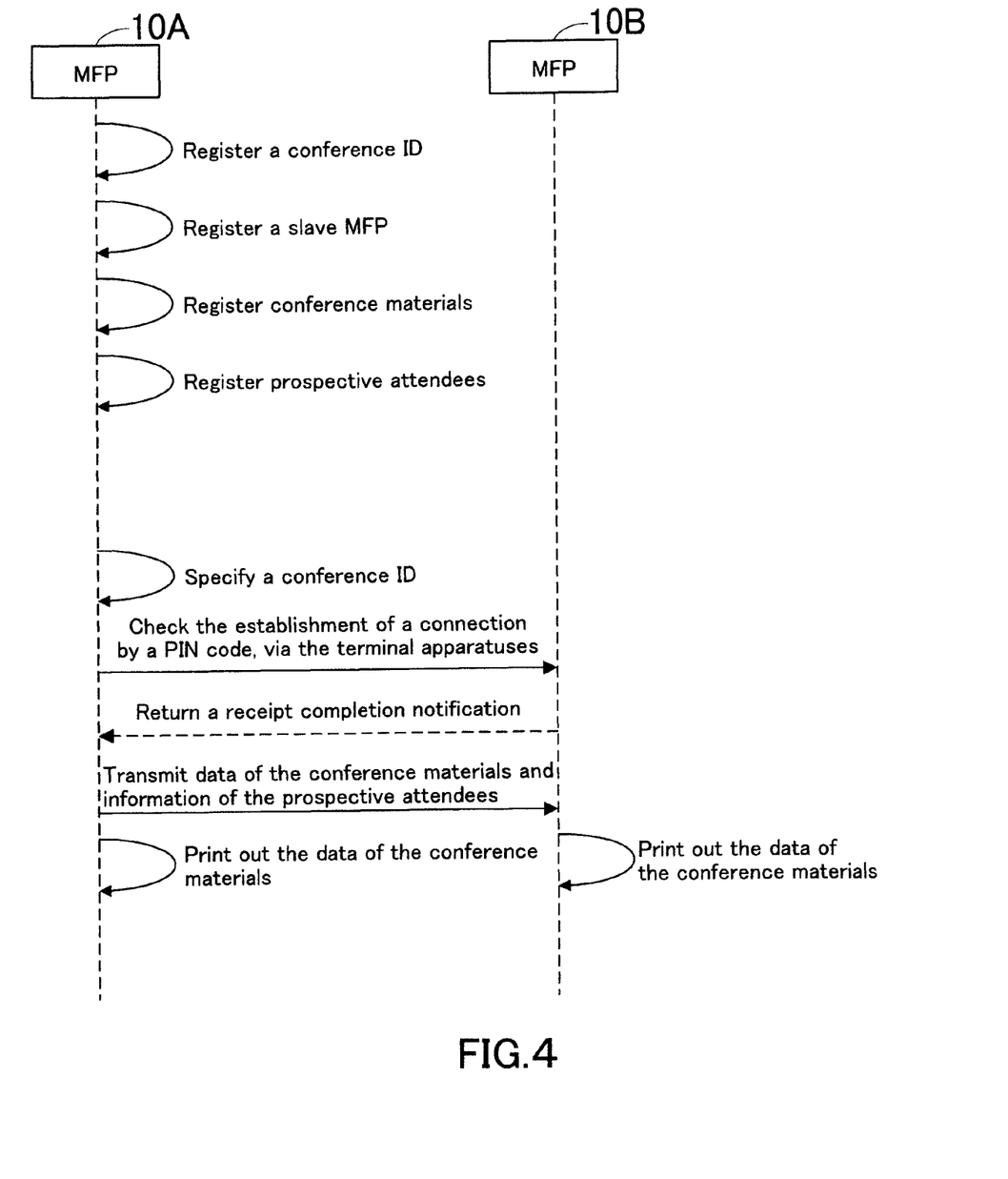
FIG. 4 is a view also to explain the usage of the print system for conferencing, shown in FIG. 2.

Hereinafter, a method for using the print system of FIG. 2 will be explained with reference to FIG. 3 and FIG. 4. In the following description, the MFP 10A is provided in a conference room of conference organizers (master point) and the MFP 10B is provided in a conference room of participants (slave point). The MFP 10A provided in the master point will be also referred to as "the master MFP 10A" and the MFP 10B provided in the slave point will be also referred to as "the slave MFP 10B".

Preliminarily, conference organizers have to register in the master MFP 10A, a conference ID to identify a conference; information of the slave MFP 10B; data of conference material; and information of prospective attendees from the master point and the slave point (the conference ID, the information of the slave MFP 10B, the data of conference material and the information of the prospective attendees are also referred to as "conference information", collectively).

Prior to the start of a conference, the conference organizers enters a conference ID in the master MFP 10A and operate the terminal apparatus 20A. Then, the terminal apparatus 20A transmits a connection check signal such as a PIN code, to the terminal apparatus 20B in the slave point, via the MFP 10A and the network 40.

Receiving the connection check signal, the terminal apparatus 20B in the slave point returns a receipt completion notification to the terminal apparatus 20A in the master point. Receiving this notification, the terminal apparatus 20A in the master point confirms the completion of a connection (the establishment of a connection) and returns a connection completion signal to the master MFP 10A.

By receiving the connection completion signal, the master MFP 10A detects the start of a conference and transmits to the slave MFP 10B, the data of conference material and the information of prospective attendees from the slave point, via the network 40.

The slave MFP 10B receives and obtains the data of conference material and the information of prospective attendees from the slave point, and prints as many copies of conference material as the number of the prospective attendees.

Meanwhile, detecting the start of a conference, the master MFP 10A also prints as many copies of conference material as the number of prospective attendees from the master point.

After that, voice of attendees in the master point and the slave point is entered in the terminal apparatuses 20A and 20B in the master point and the slave point, and outputted from the other terminal apparatuses 20B and 20A in the slave point and the master point, respectively.

Figure 5:
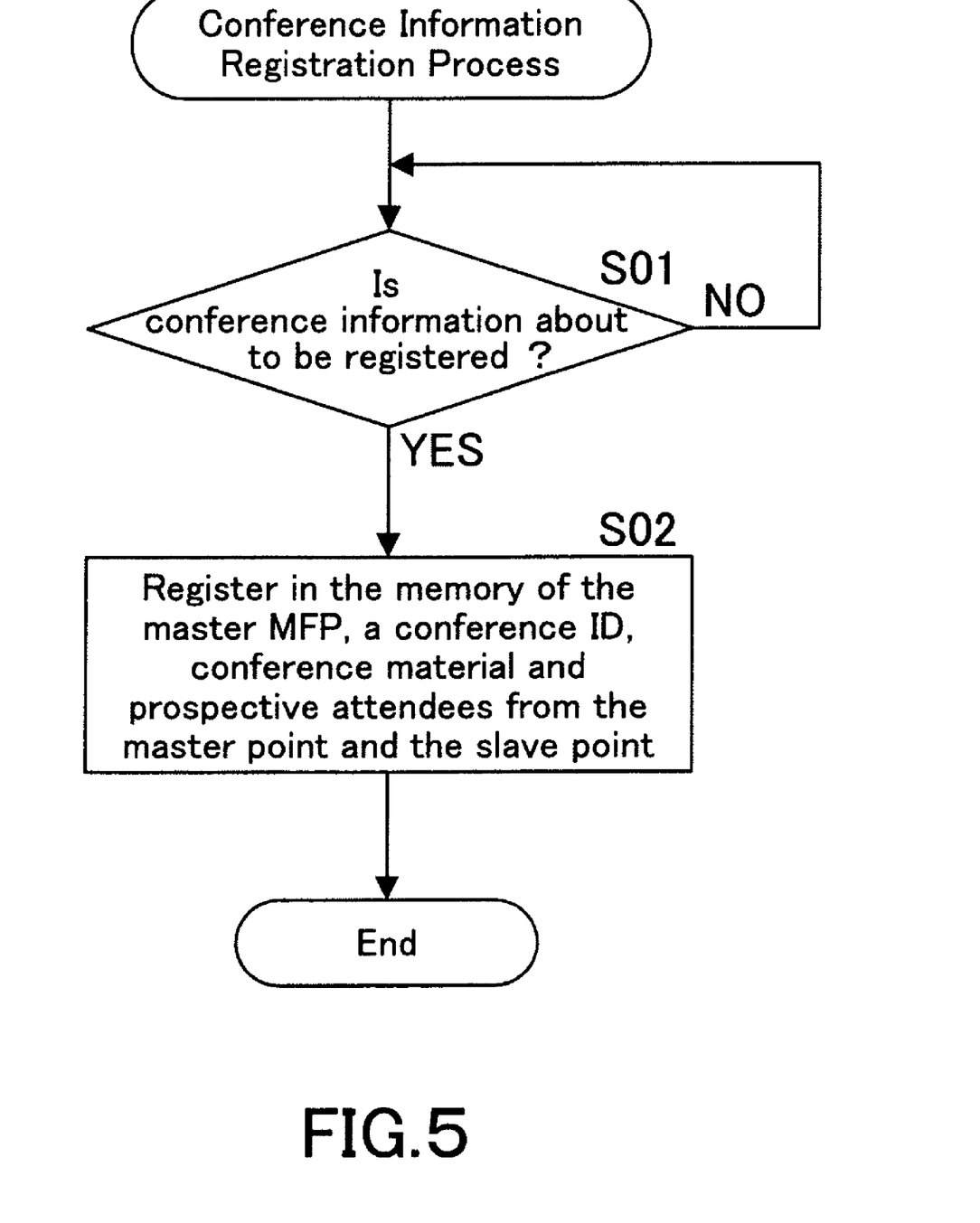
FIG. 5 is a flowchart representing a procedure executed by a master MFP, when conference organizers register conference information in the master MFP.

FIG. 5 is a flowchart representing a procedure executed in the master MFP 10A, when conference organizers register conference information in the master MFP 10A.

In Step S01, it is judged whether or not conference information is about to be registered, according to an instruction of a user trying to do so. And in Step S02, conference information such as a conference ID, data of conference material and information of prospective attendees from the master point and the slave point, is registered in the memory 13A of the master MFP 10A. There may be in the memory 13, some Boxes that are areas capable of storing data in segments, and the conference information may be registered in predetermined one among the Boxes.

Figure 6:
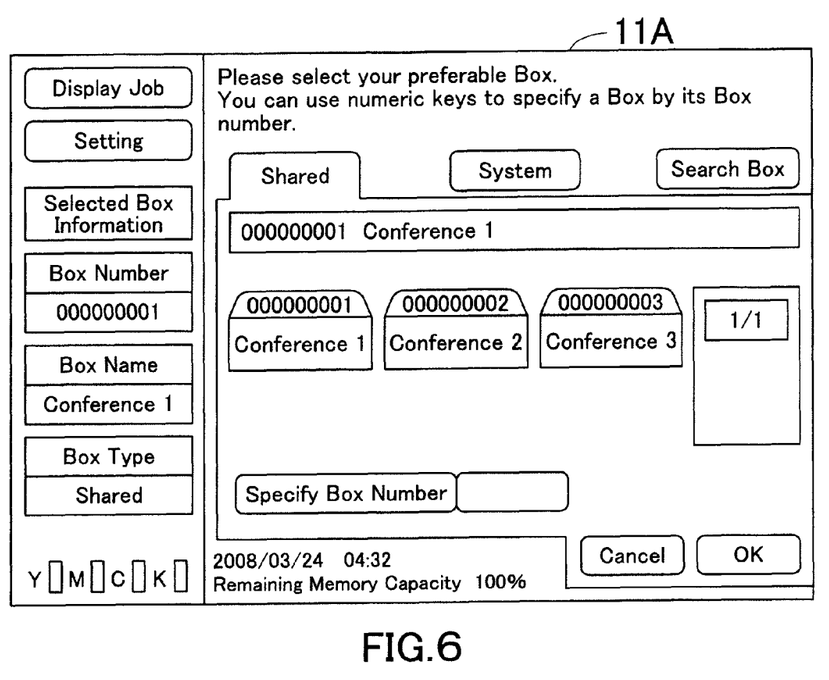
FIG. 6 is a view showing a screen in which a plurality of Boxes capable of storing data of conference material and other data, are listed.

FIG. 6 is a screen displayed on the display 11A, showing a plurality of such Boxes therein. In this example, there are three Boxes named as "Conference 1", "Conference 2" and "Conference 3", and the user trying to register the conference information selects one of the Boxes.

Figure 7:
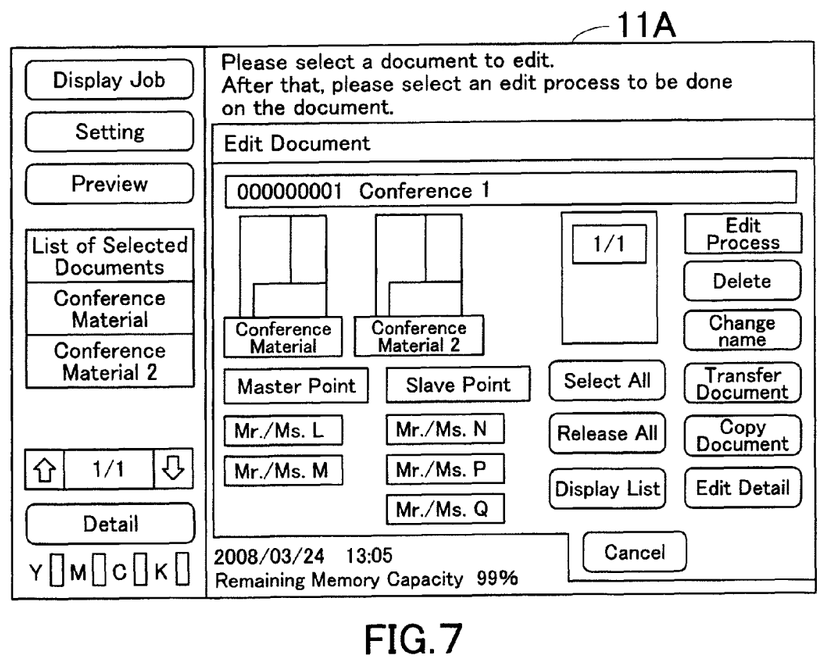
FIG. 7 is a view showing a screen that is displayed when a user completes registering data of conference material, information of prospective attendees and other data, after selecting the Box "Conference 1"

FIG. 7 is a view showing a screen that is displayed when the user completes registering data of conference material, information of prospective attendees and other data, after selecting the Box "Conference 1". In this example, the two data pieces, "Conference Material" and "Conference Material 2" are registered as conference material. And the two persons, "Mr./Ms. L" and "Mr./Ms. M", are registered as prospective attendees from the master point, and the three persons, "Mr./Ms. N", "Mr./Ms. P" and "Mr./Ms. Q", are registered as prospective attendees from the slave point.

Figure 8:
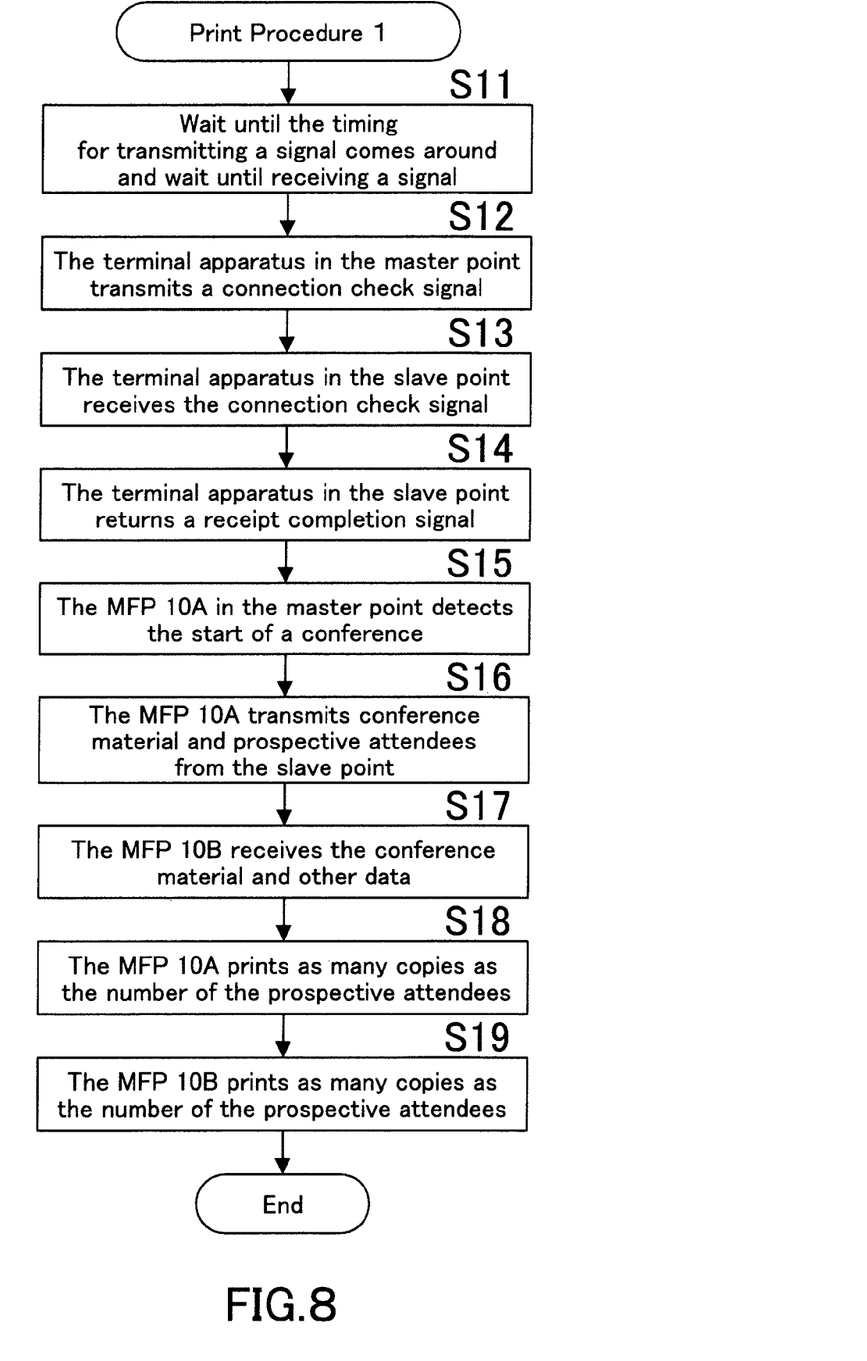
FIG. 8 is a flowchart to explain a print procedure that is executed by the print system for conferencing, shown in FIG. 2.

FIG. 8 is a flowchart to explain a print procedure that is executed by the print system for conferencing, shown in FIG. 2.

In Step S11, the terminal apparatuses 20A and 20B in the master point and the slave point, wait until the timing for transmitting a connection check signal comes around and wait until receiving a connection check signal.

The terminal apparatus 20A in the master point transmits a connection check signal in Step S12. Then, the terminal apparatus 20B in the slave point receives this signal in Step S13 and returns a receipt completion signal in Step S14.

By receiving the receipt completion signal, the terminal apparatus 20A in the master point confirms the establishment of a connection. And the master MFP 10A detects the start of a conference in Step S15.

In Step S16, the master MFP 10A transmits to the slave MFP 10B, data of conference material and information of prospective attendees from the slave point, which are preliminarily registered therein.

And in Step S17, the slave MFP 10B receives the data of conference material and the information of the prospective attendees and records them in the memory 13B.

Subsequently, the master MFP 10A prints as many copies of conference material as the number of prospective attendees from the master point, in Step S18. Meanwhile, the slave MFP 10B prints as many copies of conference material as the number of prospective attendees from the slave point, in Step S19.

As described above, in this embodiment, the MFP 10A and the MFP 10B in the master point and the slave point print out data of conference material, when the start of a conference is detected. Thus, if a scheduled conference happens to be changed or canceled before the start thereof, the start of the conference is never detected and data of conference material is never printed out. Therefore, even if a scheduled conference happens to be changed or cancelled, inconveniences such that printed material become wasted and conference information is leaked due to the existence of the printed material, can be eliminated, and this could contribute to cost-cutting and improve security of the print system for conferencing. Furthermore, as many copies of conference material as the number of prospective attendees are printed, and this could serve to prevent unnecessary printing.

Figure 9:
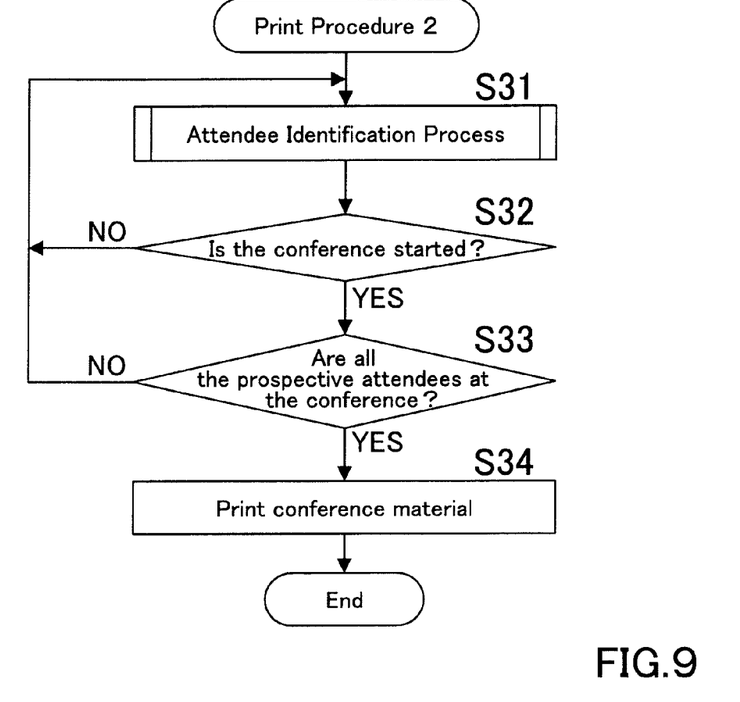
FIG. 9 is a flowchart to explain another example of a print procedure that is executed by the print system for conferencing, shown in FIG. 2.

FIG. 9 is a flowchart to explain another example of a print procedure that is executed by the print system for conferencing, shown in FIG. 2.

In this example, data of print material is printed out only if all prospective attendees are confirmed to be at a conference in the master point or the slave point.

In Step S31, the master MFP 10A or the slave MFP 10B performs an attendee identification process to identify attendees at a conference in the master point or the slave point. This process will be further described later.

In Step S32, the master MFP 10A or the slave MFP 10B judges whether or not the conference is started. The master MFP 10A makes a judgment according to the processes, Steps S11 through S15 shown in FIG. 8. The slave MFP 10B judges that the conference is started, if having received data of conference material and information of prospective attendees.

If the conference is started (YES in Step S32), then in Step S33, the master MFP 10A or the slave MFP 10B compares the attendees identified in Step S31 with the prospective attendees from the master point or the slave point, which are preliminarily registered therein, and thereby judges whether or not all the prospective attendees are at the conference, in other words, whether or not the identified attendees are identical with the prospective attendees registered in advance.

If all the prospective attendees are at the conference (YES in Step S33), the master MFP 10A or the slave MFP 10B prints as many copies of conference material as the number of the attendees, in Step S34. If not all the prospective attendees are at the conference (NO in Step S38), the routine goes back to Step S31. Also, if the conference is not started yet (NO in Step S32), the routine goes back to Step S31.

Figure 10:
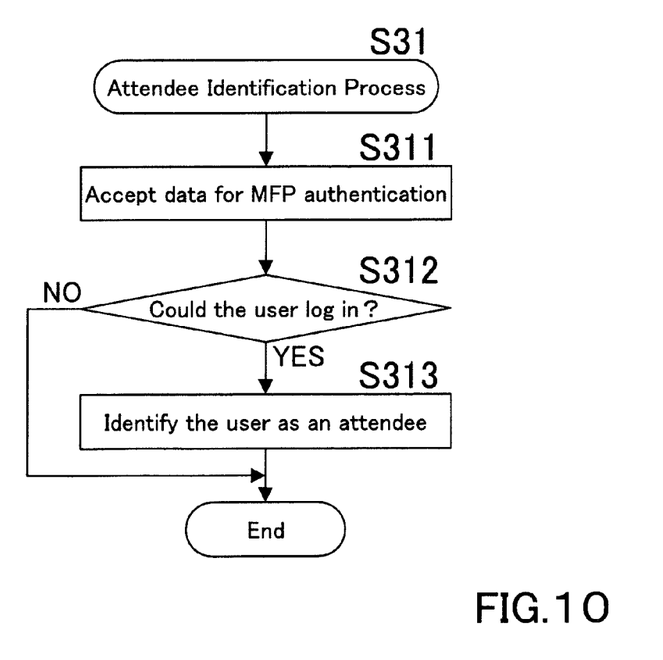
FIG. 10 is a flowchart representing an attendee identification process in Step S31 of FIG. 9.

FIG. 10 is a flowchart representing the attendee identification process in Step S31 of FIG. 9.

In Step S311, authentication data entered by a user is accepted. In this example, authentication is performed based on authentication information entered via the manipulated input portion 12A or 12B of the master MFP 10A or the slave MFP 10B (this is referred to as "MFP authentication" in Figure). Alternatively, authentication may be performed based on authentication information entered from a USB memory or etc. employed in the authentication device 30A or 30B, or may be performed by a facial recognition system.

In Step S312, it is judged whether or not the user could log in the master MFP 10A or the slave MFP 10B, by MFP authentication. If he/she could log in (YES in Step S312), the user is identified as an attendee of the conference and registered in the memory 13A or the 13B, in Step S313. If he/she could not login (NO in Step S312), the subroutine immediately returns to the main routine.

As described above, in this example, data of conference material is printed out if attendees identified by the master MFP 10A or the slave MFP 10B are identical with prospective attendees registered in advance. Thus, this is more effective to prevent unnecessary printing and eliminate the risk of leaking of conference information.

Figure 11:
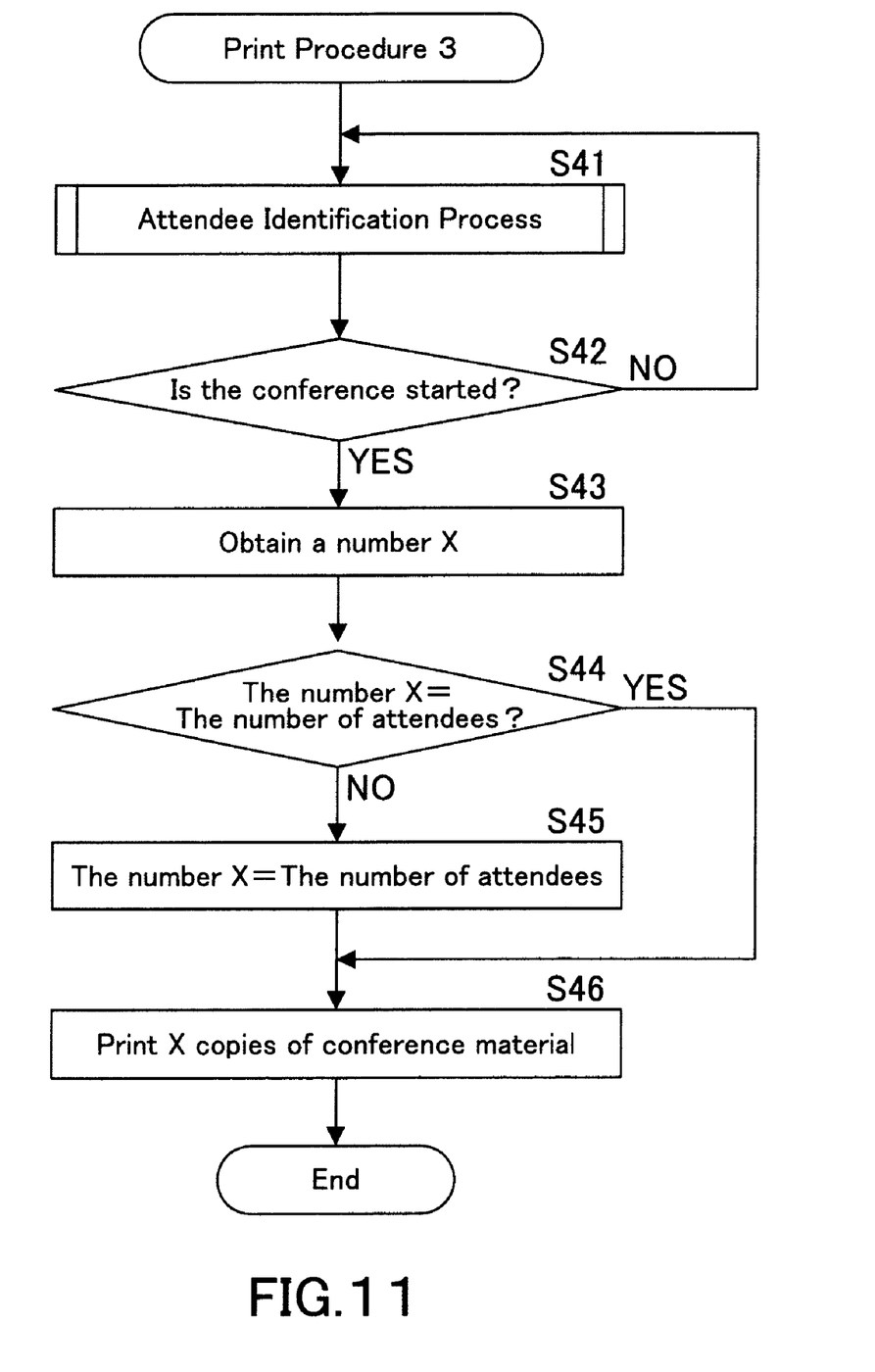
FIG. 11 is a flowchart to explain yet another example of a print procedure that is executed by the print system for conferencing, shown in FIG. 2.

FIG. 11 is a flowchart to explain yet another example of a print procedure that is executed by the print system for conferencing, shown in FIG. 2.

In this example, as many copies of conference material as the number of attendees are printed, even if the attendees are not identical with prospective attendees in the master point or the slave point.

In Step S41, the master MFP 10A or the slave MFP 10B performs an attendee identification process. This process will be further described later.

Then, it is judged in Step S42, whether or not a conference is started. This judgment is made in the same way as explained with Step S32 of FIG. 9. If a conference is not started yet (NO in Step S42), the routine goes back to Step S41.

If a conference is started (YES in Step S42), a number X that is the number of prospective attendees is extracted from information of prospective attendees, in Step S43.

Then, it is judged in Step S44, whether or not the number X is identical with the number of attendees. If it is identical therewith (YES in Step S44), X copies of conference material are printed. On the other hand, if the number X is not identical with the number of attendees (NO in Step S44), the number of attendees is set to the number X in Step S45, and X copies of conference material are printed in Step S46.

Figure 12:
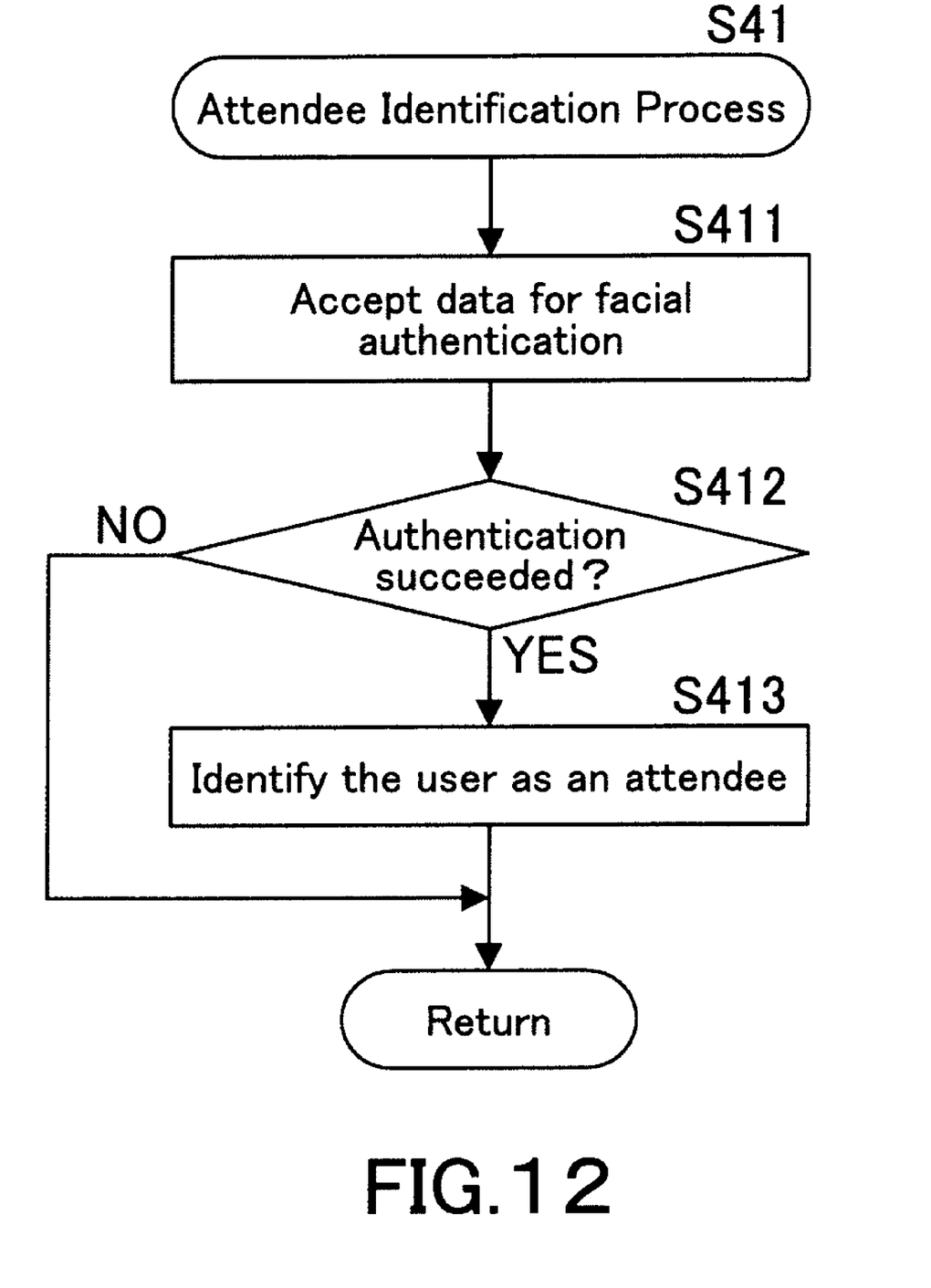
FIG. 12 is a flowchart representing an attendee identification process in Step S41 of FIG. 11.

FIG. 12 is a flowchart representing the attendee identification process in Step S41 of FIG. 11.

In Step S411, facial authentication data entered by a user (for example, a facial portrait taken by a camera of the authentication device 20A or 20B) is accepted. Then, it is judged in Step S412, whether or not there exists any data piece of the user who is identified based on the entered facial authentication data, among the facial authentication data pieces registered in advance in the memory 13A or 13B. If there exists any data piece of the user who is identified based on the entered facial authentication data (YES in Step S412), the user is identified as an attendee and registered in the memory 13A or 13B, in Step S413. If there exists no data piece of the user who is identified based on the entered facial authentication data (NO in Step S412), the subroutine immediately returns to the main routine.

Alternatively, in the attendee identification process in Step S41, authentication may be performed by MFP authentication as explained with FIG. 10.

As described above, in this example, as many copies of conference material as the number of attendees identified by the master MFP 10A or the slave MFP 10B, are printed by the master MFP 10A or the slave MFP 10B, if the identified attendees are not identical with prospective attendees. Thus, even if there are at a conference more or less attendees against prospective attendees, an inconvenience such that data of conference material is not printed out, can be eliminated, and this would be closer to practical use. Furthermore, even if more or less attendees, as many copies of conference material as the number of attendees are printed, and this could effectively serve to prevent unnecessary printing and eliminate the risk for leaking of conference information.

In these embodiments having been described so far, data of conference material and information of prospective attendees are transmitted from the master MFP 10A to the slave MFP 10B, when the start of a conference is detected. However, the timing for the transmission is not limited. For example, data of conference material and other data may be automatically transmitted to the slave MFP 10B, when conference organizers or etc. register the data of conference material and other data.

Figure 13:
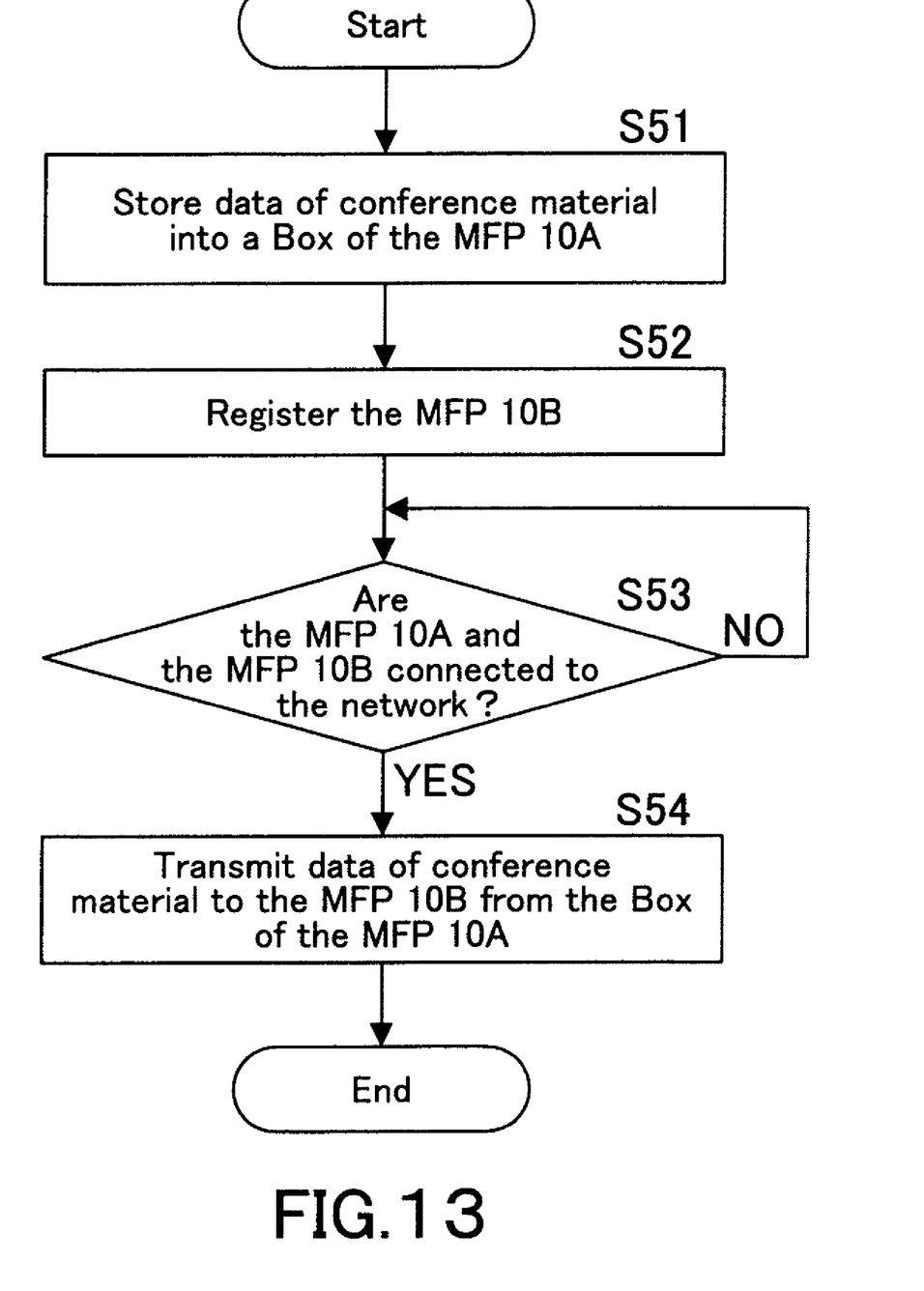
FIG. 13 is a flowchart representing a procedure to transfer data of conference material automatically.

A procedure to transmit data of conference material automatically, executed by a print system having such a configuration right above, will be explained with reference to a flowchart shown in FIG. 13.

Conference organizers or etc. store data of conference material in a predetermined Box of the master MFP 10A in Step S51, and register the slave MFP 10B in Step S52. Then in Step S53, the master MFP 10A judges whether or not the master MFP 10A and the slave MFP 10B are connected to the network.

If the master MFP 10A and the slave MFP 10B are not connected to the network (NO in Step S53), the routine waits until they are connected. If they are connected (YES in Step S53), the data of conference material is transmitted to the slave MFP 10B in Step S54.

Furthermore, in these embodiments having been described so far, data of conference material and information of prospective attendees are transmitted from the master MFP 10A to the slave MFP 10B, and thus the slave MFP 10B obtains them. Alternatively, the slave MFP 10B may request for data of conference material, by accessing the master MFP 10A.

Furthermore, in these embodiments, the establishment of a connection between the terminal apparatuses 20A and 20B is confirmed, and thereby the start of a conference is detected. Alternatively, another configuration may be employed, wherein conference organizers, for example, operate a conference start button provided on the master MFP 10A, and thereby the start of a conference is detected, and a notification of the detection is further transmitted to the slave MFP 10B, and the MFP 10B detects the start of a conference according to the notification. Or alternatively, yet another configuration to detect the start of a conference, may be employed.

Furthermore, the print apparatus is not limited to a MFP. Alternatively, the print apparatus may be a copier, a printer or etc.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. A print system for conferencing, comprising:
   a plurality of print apparatuses provided in a plurality of conference locations and interconnected via a network;
   terminal apparatuses capable of conferencing, when a connection is established between them, provided in the respective conference locations; and
   a storage that registers in itself, data of conference material and information of prospective attendees from the respective conference locations; and
   wherein each of the print apparatuses provided in the respective conference locations further comprises:
      an obtainer that obtains the data of conference material and the information of prospective attendees from the conference location where the print apparatus itself is provided, which are registered in the storage;
      a memory that records in itself, the data of conference material and the information of the prospective attendees, obtained therefrom;
      a detector that detects the start of a conference, by an establishment of a connection between the terminal apparatus provided in the respective conference location where the print apparatus itself is provided and the other terminal apparatus; and
      a printer that prints as many copies of conference material as the number of the prospective attendees in the respective conference location where the print apparatus itself is provided, if the detector detects the start of a conference.

2. The print system for conferencing recited in claim 1, wherein:
   each of the print apparatuses further comprises an identifier that identifies attendees in the respective conference location where the print apparatus itself is provided; and
   the printer prints out the data of conference material, if the detector detects the start of the conference and the attendees identified by the identifier are identical with the prospective attendees.

3. The print system for conferencing recited in claim 1, wherein:
   each of the print apparatuses further comprises an identifier that identifies attendees in the respective conference location where the print apparatus itself is provided; and
   the printer prints as many copies of conference material as the number of the attendees identified by the identifier, if the detector detects the start of the conference and the attendees are not identical with the prospective attendees.

4. The print system for conferencing recited in claim 2, further comprising:
   a user authenticator,
   and wherein:
      the identifier identifies the attendees of a conference based on information of the users authenticated by the user authenticator.

5. The print system for conferencing recited in claim 4, wherein:
   the user authenticator includes a face-recognition unit that recognizes users' faces.

6. A print method executed by a print system for conferencing in which a plurality of print apparatuses are provided in a plurality of conference locations and interconnected via a network, and terminal apparatuses capable of conferencing, when a connection is established between them, provided in the respective conference locations comprising:
   registering in a storage, data of conference material and information of prospective attendees from the respective conference locations;
   obtaining by each of the print apparatuses, the data of conference material and the information of prospective attendees from the conference location where the print apparatus is provided, which are registered in the storage;
   recording in a memory of each of the print apparatuses, the data of conference material and the information of the prospective attendees, obtained therefrom;
   detecting with a detector the start of a conference, by an establishment of a connection between the terminal apparatus provided in the respective conference location where the print apparatus itself is provided and the other terminal apparatus; and
   printing by each of the print apparatuses, as many copies of conference material as the number of the prospective attendees in the respective conference location where the print apparatus itself is provided, if the start of a conference is detected.

7. The print method executed by a print system for conferencing, recited in claim 6, further comprising:
   identifying attendees in the respective conference location where the print apparatus itself is provided by the respective print apparatuses,
   and wherein:
      the respective print apparatuses print out the data of conference material, if the identified attendees are identical with the prospective attendees.

8. The print method executed by a print system for conferencing, recited in claim 6, further comprising:
   identifying attendees in the respective conference location where the print apparatus itself is provided by the respective print apparatuses,
   and wherein:
      the respective print apparatuses print as many copies of conference material as the number of the identified attendees, if the identified attendees are not identical with the prospective attendees.

9. The print method executed by a print system for conferencing, recited in claim 7, further comprising:
   performing user authentication in the respective conference locations,
   and wherein:
      the attendees of a conference are identified based on information of the authenticated users.

10. The print method executed by a print system for conferencing, recited in claim 9, further comprising:
    performing user authentication by a face-recognition process to recognize users' faces.

11. The print system for conferencing recited in claim 1, wherein:
    the terminal apparatus include an audio conference unit or a video conference unit for conferencing with attendees' voice.

12. The print method executed by a print system for conferencing, recited in claim 6, wherein:
    the terminal apparatus include an audio conference unit or a video conference unit for conferencing with attendees' voice.

* * * * *